US009502170B2

(12) United States Patent
Odahara

(10) Patent No.: US 9,502,170 B2
(45) Date of Patent: Nov. 22, 2016

(54) ELECTRONIC COMPONENT AND METHOD FOR PRODUCING SAME

(71) Applicant: MURATA MANUFACTURING CO., LTD., Kyoto (JP)

(72) Inventor: Mitsuru Odahara, Kyoto-fu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 341 days.

(21) Appl. No.: 14/087,771

(22) Filed: Nov. 22, 2013

(65) Prior Publication Data

US 2014/0078643 A1 Mar. 20, 2014

Related U.S. Application Data

(63) Continuation of application No. PCT/JP2012/063128, filed on May 23, 2012.

(30) Foreign Application Priority Data

Jun. 15, 2011 (JP) ................................ 2011-133196

(51) Int. Cl.
*H01G 4/30* (2006.01)
*H01G 4/005* (2006.01)
*H01G 4/228* (2006.01)
*H01F 27/29* (2006.01)
*H01F 17/00* (2006.01)

(52) U.S. Cl.
CPC .......... *H01F 27/29* (2013.01); *H01F 17/0013* (2013.01); *H01F 27/292* (2013.01)

(58) Field of Classification Search
CPC ........................................................ H01G 4/30
USPC ........ 361/301.4, 303, 306.1, 306.3; 29/25.42
See application file for complete search history.

(56) References Cited

U.S. PATENT DOCUMENTS 6,715,197 B2 * 4/2004 Okuyama ........... H01F 17/0013 29/592.1
7,075,775 B2 * 7/2006 Yamazaki ............... H01C 1/02 338/237

(Continued)

FOREIGN PATENT DOCUMENTS

CN 101228601 A 7/2008
JP 2002-367833 A 12/2002

(Continued)

OTHER PUBLICATIONS

International Search Report; PCT/JP2012/063128; Aug. 14, 2012.

(Continued)

*Primary Examiner* — Eric Thomas
(74) *Attorney, Agent, or Firm* — Studebaker & Brackett PC

(57) ABSTRACT

An electronic component comprises: a laminate having a plurality of rectangular insulator layers and a mounting surface formed by a series of sides of the insulator layers. A plurality of first lead-out conductors are exposed between the insulator layers at the mounting surface. A first external electrode covers the first lead-out conductors at the mounting surface. The first external electrode is located at a first formation area at the mounting surface. The first formation area, when viewed in a plan view in an extending direction in which the sides of the insulator layers that constitute the mounting surface extend, is curved so as to bulge at a center of the formation area relative to opposite ends thereof.

20 Claims, 12 Drawing Sheets

(56) References Cited

U.S. PATENT DOCUMENTS

| | | | | |
|---|---|---|---|---|
| 7,633,739 | B2 * | 12/2009 | Devoe | H01G 4/232 361/306.3 |
| 7,995,326 | B2 * | 8/2011 | Ueda | H01C 1/142 361/306.1 |
| 2008/0128860 | A1 | 6/2008 | Sawada et al. | |
| 2010/0085682 | A1 * | 4/2010 | Abe | H01G 4/012 361/303 |
| 2014/0078643 | A1 | 3/2014 | Odahara | |

FOREIGN PATENT DOCUMENTS

| | | | |
|---|---|---|---|
| JP | 2004-200373 | A | 7/2004 |
| JP | 2005-322743 | A | 11/2005 |
| JP | 2006-114626 | A | 4/2006 |
| JP | 2006-237078 | A | 9/2006 |
| JP | 2007-096215 | A | 4/2007 |
| JP | 2009-111314 | A | 5/2009 |
| JP | 2010-080703 | A | 4/2010 |
| JP | 5668849 | B2 | 2/2015 |

OTHER PUBLICATIONS

Written Opinion of the International Searching Authority; PCT/JP2012/063128; Aug. 14, 2012.

An Office Action; "Decision of Refusal," issued by the Japanese Patent Office on Aug. 19, 2014, which corresponds to Japanese Patent Application No. 2013-520488 and is related to U.S. Appl. No. 14/087,771; with English language translation.

An Office Action; "Notification of Reasons for Refusal," issued by the Japanese Patent Office on Jan. 7, 2014, which corresponds to Japanese Patent Application No. 2013-520488 and is related to U.S. Appl. No. 14/087,771; with English language translation.

An Office Action; "Notification of Reasons for Refusal," issued by the Japanese Patent Office on Jun. 14, 2016, which corresponds to Japanese Patent Application No. 2014-213720 and is related to U.S. Appl. No. 14/087,771; with English language translation.

* cited by examiner

ELECTRONIC COMPONENT AND METHOD FOR PRODUCING SAME

CROSS REFERENCE TO RELATED APPLICATIONS

This application claims benefit of priority to Japanese Patent Application No. 2011-133196 filed on Jun. 15, 2011, and to International Patent Application No. PCT/JP2012/063128 filed on May 23, 2012, the entire content of each of which is incorporated herein by reference.

TECHNICAL FIELD

The present disclosure relates to electronic components and methods for producing the same, more particularly to an electronic component including a laminate formed by laminating insulator layers and a method for producing the same.

BACKGROUND

As a conventional electronic component, a laminated coil component described in, for example, Japanese Patent Laid-Open Publication No. 2005-322743 is known. FIG. 15 is a transparent view of the laminated coil component 100 described in Japanese Patent Laid-Open Publication No. 2005-322743.

The laminated coil component 100 includes a ceramic laminate 110, a coil conductor 120, and a set of external electrodes 130. The ceramic laminate 110 is formed by laminating a plurality of ceramic layers. The coil conductor 120 is a helical coil formed by connecting inner conductor layers 121 and via holes 122 in series, so as to have a coil axis parallel to the direction of lamination of the ceramic laminate 110. Each of the external electrodes 130 is provided on a mounting surface positioned in a direction perpendicular to the direction of lamination, and is connected to either end of the coil conductor 120. The laminated coil component 100 thus configured is mounted onto a circuit board by soldering the external electrodes 130 onto lands of the circuit board. However, the laminated coil component 100 described in Japanese Patent Laid-Open Publication No. 2005-322743 might have air left trapped in the solder. More specifically, the external electrodes 130 are provided only on the mounting surface and in the form of flat plates. When the laminated coil component 100 is mounted onto the circuit board, if air is trapped in the solder, it is caught between the external electrodes 130 and the lands, so that it cannot escape from the solder. In this manner, when air remains in the solder, there might be poor connections between the lands and the external electrodes 130.

SUMMARY

The present disclosure provides an electronic component capable of reducing poor connection between a land and an external electrode and a method for producing the same.

An electronic component according to one embodiment of the present disclosure includes: a laminate having a plurality of rectangular insulator layers and a mounting surface formed by a series of sides of the insulator layers; a plurality of first lead-out conductors exposed between the insulator layers at the mounting surface; and a first external electrode covering the first lead-out conductors at the mounting surface, the first external electrode being located at a first formation area at the mounting surface, the first formation area, when viewed in a plan view in an extending direction in which the sides of the insulator layers that constitute the mounting surface extend, is curved so as to bulge at a center of the first formation area relative to opposite ends thereof. Further, the other embodiment of the present disclosure is directed to a method for producing an electronic component, the electronic component including a laminate having a plurality of rectangular insulator layers and a mounting surface formed by a series of sides of the insulator layers; a plurality of first lead-out conductors exposed between the insulator layers at the mounting surface; and a first external electrode covering the first lead-out conductors at the mounting surface, the first external electrode being located at a first formation area at the mounting surface, and the first formation area, when viewed in a plan view in an extending direction in which the sides of the insulator layers that constitute the mounting surface extend, being curved so as to bulge at a center of the first formation area relative to opposite ends thereof, and a circuit element including a plurality of conductive members. The method of the other embodiment of the present disclosure includes the steps of: obtaining the laminate in an unsintered state, the laminate being provided with the first lead-out conductors and the conductive members; and firing the laminate.

DETAILED DESCRIPTION

Hereinafter, an electronic component according to an embodiment of the present disclosure and a method for producing the same will be described.

Figure 1A:
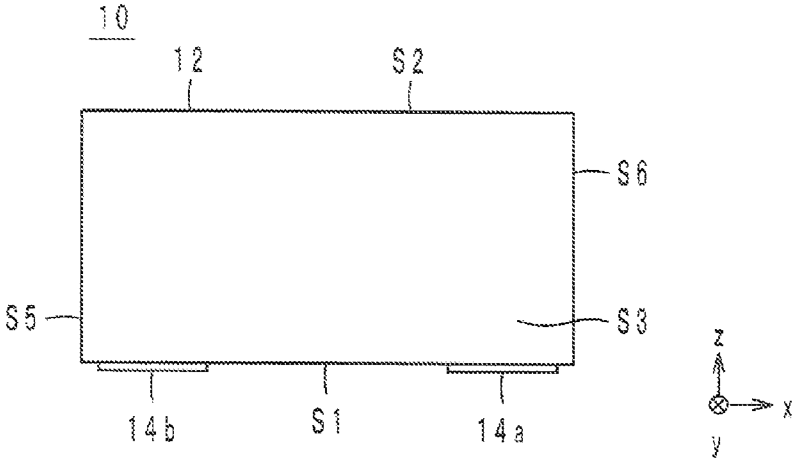
FIGS. 1A, 1B, and 1C are plan views of an electronic component according to an exemplary embodiment of the disclosure
Figure 1B:
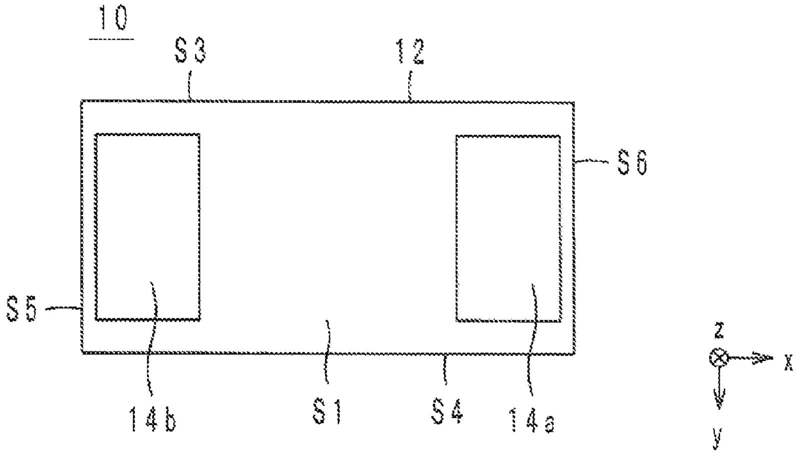
Figure 1C:
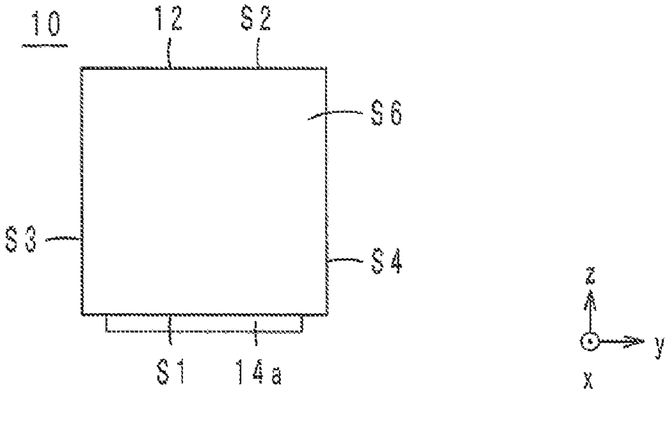
Figure 2:
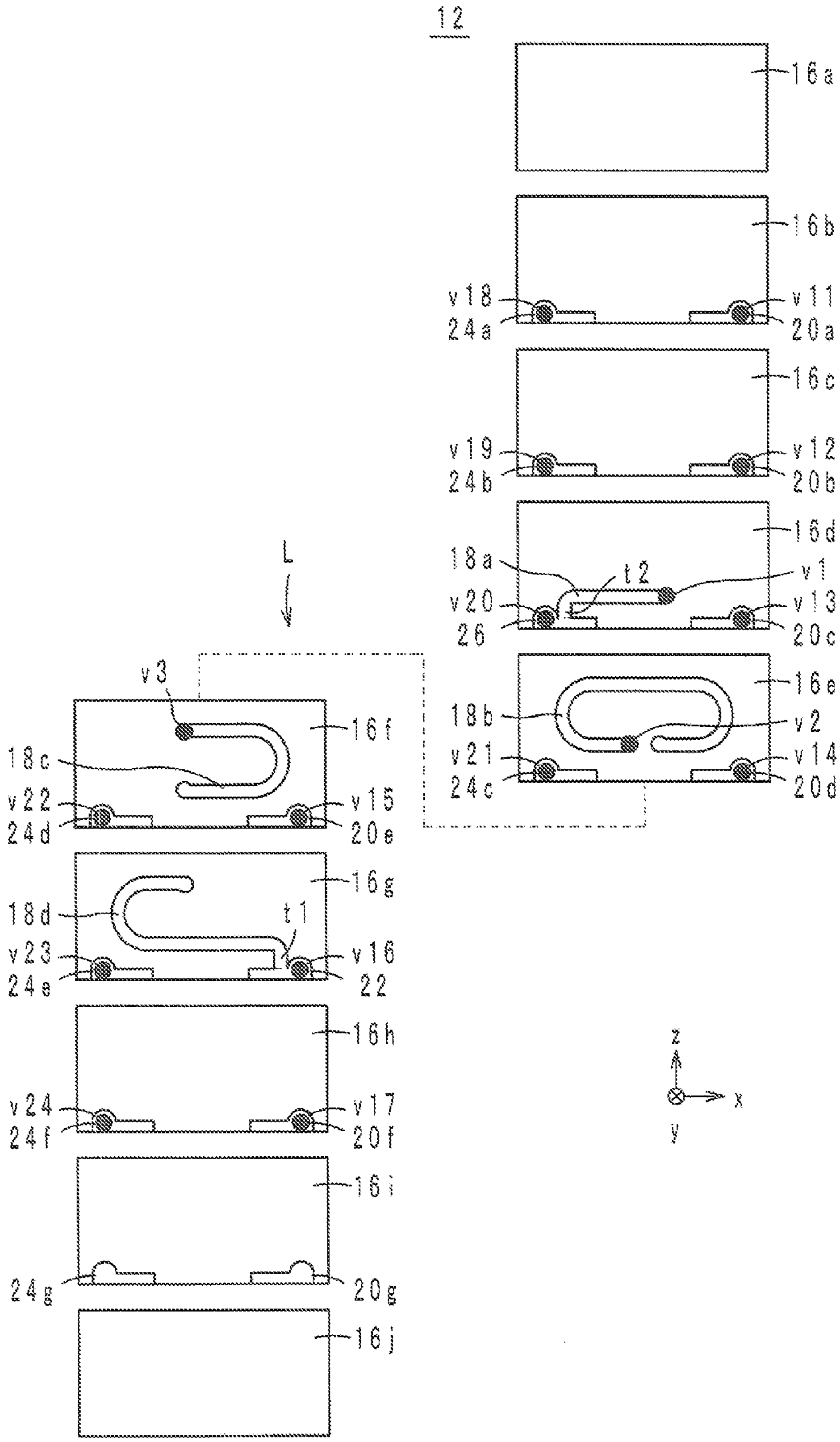
FIG. 2 is an exploded view of a laminate in the electronic component of FIG. 1.
Figure 3A:
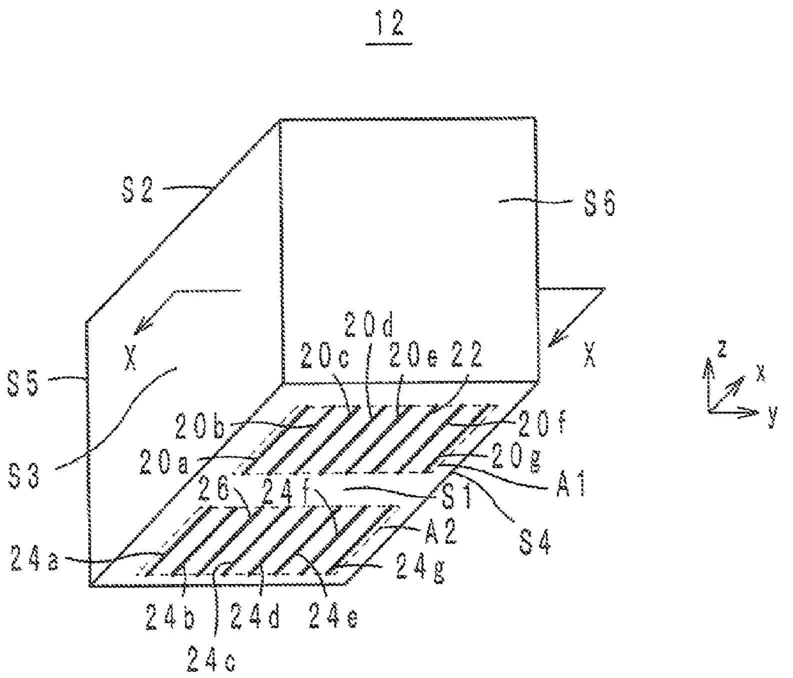
FIG. 3A is an external oblique view of the laminate in the electronic component of FIG. 1.
Figure 3B:
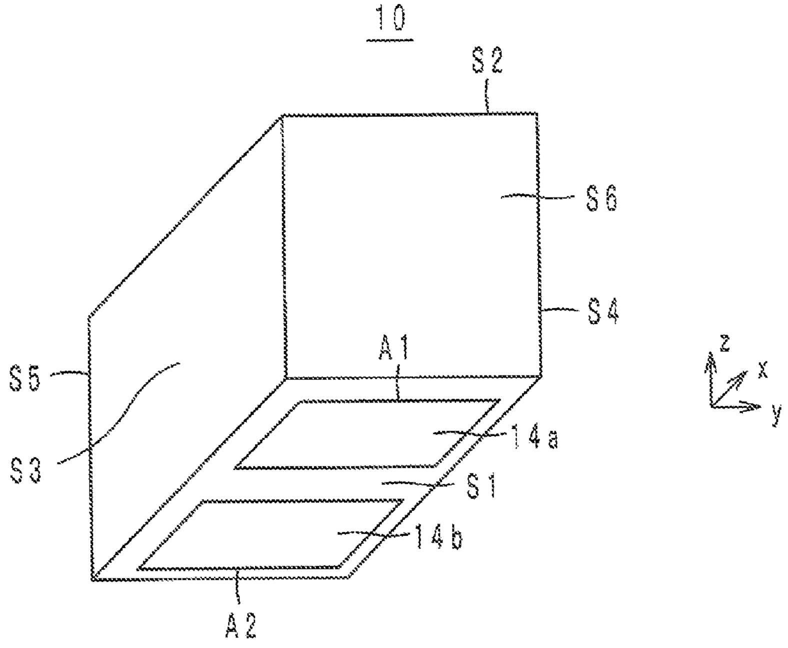
FIG. 3B is an external oblique view of the electronic component of FIG. 1.
Figure 4:
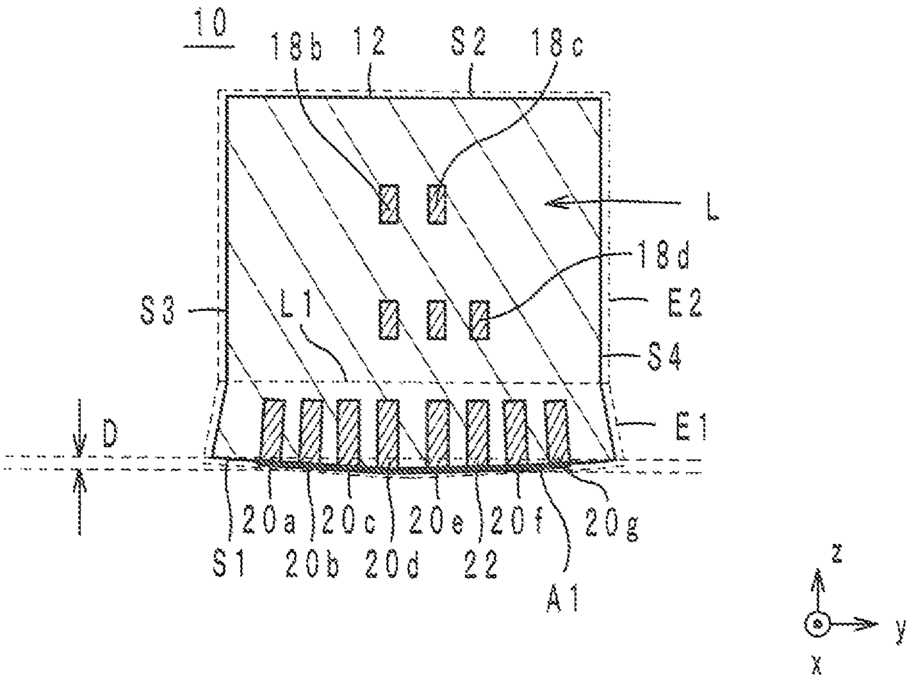
FIG. 4 is a cross-sectional structure view taken along line X-X of FIG. 3A.

Configuration of Electronic Component: The electronic component according to one exemplary embodiment of the present disclosure will now be described with reference to the drawings. FIGS. 1A, 1B, and 1C are plan views of the electronic component 10 according to the embodiment. FIG. 2 is an exploded view of a laminate 12 in the electronic component 10 of FIG. 1. FIG. 3A is an external oblique view of the laminate 12 in the electronic component 10 of FIG. 1. FIG. 3B is an external oblique view of the electronic component 10 of FIG. 1. FIG. 4 is a cross-sectional structure view taken along line X-X of FIG. 3A. In FIG. 4, external electrodes 14*a* and 14*b* are not shown. In the following, the direction of lamination of the electronic component 10 will be defined as a y-axis direction, and the direction along a short side of the electronic component 10 in a plan view in the y-axis direction will be defined as a z-axis direction, and the direction along a long side of the electronic component 10 in a plan view in the y-axis direction will be defined as an x-axis direction. The x-, y- and z-axes are perpendicular to one another.

The electronic component 10 includes the laminate 12, the external electrodes 14*a* and 14*b*, dummy lead-out conductors 20*a* to 20*g* and 24*a* to 24*g*, lead-out conductors 22 and 26, a coil L, and via-hole conductors v11 to v24, as shown in FIGS. 1A, 1B, 1C, and 2.

The laminate 12 is in the shape of a rectangular solid, and has the coil L provided therein. The laminate 12 has a bottom surface S1, a top surface S2, side surfaces S3 and S4, and end surfaces S5 and S6. The bottom surface S1 is a surface of the laminate 12 on the negative side in the z-axis direction, and serves as a mounting surface to face a circuit board when the electronic component 10 is mounted on the circuit board. The top surface S2 is a surface of the laminate 12 on the positive side in the z-axis direction. The side surface S3 is a surface of the laminate 12 on the negative side in the y-axis direction. The side surface S4 is a surface of the laminate 12 on the positive side in the y-axis direction. The end surface S5 is a surface of the laminate 12 on the negative side in the x-axis direction. The end surface S6 is a surface of the laminate 12 on the positive side in the x-axis direction.

The laminate 12 is formed by laminating insulator layers 16*a* to 16*j* in this order, from the negative side toward the positive side in the y-axis direction, as shown in FIG. 2. Each of the insulator layers 16*a* to 16*j* has a rectangular shape, and is made of, for example, a Ni—Cu—Zn ferrite magnetic material. In the following, the surfaces of the insulator layers 16*a* to 16*j* on the negative side in the y-axis direction will be referred to as the front faces, and the surfaces of the insulator layers 16*a* to 16*j* on the positive side in the y-axis direction will be referred to as the back faces.

The bottom surface S1 is formed by a series of the long sides of the insulator layers 16*a* to 16*j* on the negative side in the z-axis direction. The top surface S2 is formed by a series of the long sides of the insulator layers 16*a* to 16*j* on the positive side in the z-axis direction. The side surface S3 is formed by the front face of the insulator layer 16*a*. The side surface S4 is formed by the back face of the insulator layer 16*j*. The end surface S5 is formed by a series of the short sides of the insulator layers 16*a* to 16*j* on the negative side in the x-axis direction. The end surface S6 is formed by a series of the short sides of the insulator layers 16*a* to 16*j* on the positive side in the x-axis direction.

The coil L includes coil conductors 18*a* to 18*d* and via-hole conductors v1 to v3, as shown in FIG. 2. The coil L is a helical coil formed by connecting the coil conductors 18*a* to 18*d* by the via-hole conductors v1 to v3. The coil L has a coil axis extending in the y-axis direction, and winds clockwise toward the negative side in the y-axis direction in a plan view from the negative side in the y-axis direction. Moreover, the coil L has terminals t1 and t2. The terminal t1 of the coil L is positioned on the positive side in the y-axis direction relative to the terminal t2.

The coil conductors 18*a* to 18*d* are provided on the insulator layers 16*d* to 16*g*, respectively, as shown in FIG. 2. Each of the coil conductors 18*a* to 18*d* is made of an Ag-based conductive material, and is a linear conductor curved so as to constitute a part of an ellipse. The coil conductors 18*a* to 18*d* overlap one another to form an ellipse in a plan view in the y-axis direction. In the following, the ends of the coil conductors 18*a* to 18*d* that are located upstream in the clockwise direction will be simply referred to as the upstream ends, and the ends of the coil conductors 18*a* to 18*d* that are located downstream in the clockwise direction will be simply referred to as the downstream ends. The terminal t1 of the coil L is at the upstream end of the coil conductor 18*d*, and the terminal t2 of the coil L is at the downstream end of the coil conductor 18*a*.

The via-hole conductors v1 to v3 connect the coil conductors 18*a* to 18*d*. More specifically, the via-hole conductor v1 connects the upstream end of the coil conductor 18*a* to the downstream end of the coil conductor 18*b*. The via-hole conductor v2 connects the upstream end of the coil conductor 18*b* to the downstream end of the coil conductor 18*c*. The via-hole conductor v3 connects the upstream end of the coil conductor 18*c* to the downstream end of the coil conductor 18*d*.

The lead-out conductor 22 is provided on the front face of the insulator layer 16*g*, so as to be exposed between the insulator layers 16*f* and 16*g* at the bottom surface S1. More specifically, the lead-out conductor 22 has a rectangular shape extending in the x-axis direction and provided along the long side of the insulator layer 16*g* on the negative side in the z-axis direction. The lead-out conductor 22 is positioned near the end of the long side of the insulator layer 16*g* that is positioned on the negative side in the z-axis direction and on the positive side in the x-axis direction, and the lead-out conductor 22 is not in contact with the short side of the insulator layer 16*g* on the positive side in the x-axis direction. As a result, the lead-out conductor 22 is exposed at the bottom surface S1 as a linear strip extending in the x-axis direction. Moreover, the lead-out conductor 22 is connected to the upstream end of the coil conductor 18*d*.

The dummy lead-out conductors 20*a* to 20*g* are provided on the front faces of the insulator layers 16*b* to 16*f*, 16*h*, and 16*i*, respectively, so as to be exposed between the insulator layers 16*a* to 16*g* at the bottom surface S1. The dummy lead-out conductors 20*a* to 20*g* have the same shape as the lead-out conductor 22, and are aligned in an entirely overlapping manner in a plan view in the y-axis direction. As a result, the lead-out conductor 22 and the dummy lead-out conductors 20*a* to 20*g* are exposed within a rectangular formation area A1 at the bottom surface S1, as shown in FIG. 3A.

The lead-out conductor 22 and the dummy lead-out conductors 20*a* to 20*g* are thicker than the coil conductors 18*a* to 18*d*, as shown in FIG. 4.

Furthermore, the dummy lead-out conductors 20*a* and 20*b* and the dummy lead-out conductors 20*f* and 20*g* are provided outside in the y-axis direction (i.e., either on the positive side or the negative side in the y-axis direction) relative to the terminals t1 and t2 of the coil L.

The lead-out conductor 26 is provided on the front face of the insulator layer 16*d*, so as to be exposed between the insulator layers 16*c* and 16*d* at the bottom surface S1. More specifically, the lead-out conductor 26 has a rectangular shape extending in the x-axis direction and provided along the long side of the insulator layer 16*d* on the negative side in the z-axis direction. The lead-out conductor 26 is positioned near the end of the long side of the insulator layer 16*d* that is positioned on the negative side in the z-axis direction and on the negative side in the x-axis direction, and the lead-out conductor 26 is not in contact with the short side of the insulator layer 16*d* on the negative side in the x-axis direction. As a result, the lead-out conductor 26 is exposed at the bottom surface S1 as a linear strip extending in the x-axis direction. Moreover, the lead-out conductor 26 is connected to the downstream end of the coil conductor 18*a*.

The dummy lead-out conductors 24*a* to 24*g* are provided on the front faces of the insulator layers 16*b*, 16*c*, and 16*e* to 16*i*, respectively, so as to be exposed between the insulator layers 16*a* to 16*g* at the bottom surface S1. The dummy lead-out conductors 24*a* to 24*g* have the same shape as the lead-out conductor 26, and are aligned in an entirely overlapping manner in a plan view in the y-axis direction. As a result, the lead-out conductor 26 and the dummy lead-out conductors 24*a* to 24*g* are exposed within a rectangular formation area A2 at the bottom surface S1, as shown in FIG. 3A.

The lead-out conductor 26 and the dummy lead-out conductors 24*a* to 24*g* are thicker than the coil conductors 18*a* to 18*d*.

Furthermore, the dummy lead-out conductors 24*a* and 24*b* and the dummy lead-out conductors 24*f* and 24*g* are provided outside in the y-axis direction (i.e., either on the positive side or the negative side in the y-axis direction) relative to the terminals t1 and t2 of the coil L.

The via-hole conductors v11 to v17 are provided so as to pierce through the insulator layers 16*b* to 16*h*, respectively, in the y-axis direction, and overlap one another in a plan view in the y-axis direction. The via-hole conductor v11 connects the dummy lead-out conductors 20*a* and 20*b*. The via-hole conductor v12 connects the dummy lead-out conductors 20*b* and 20*c*. The via-hole conductor v13 connects the dummy lead-out conductors 20*c* and 20*d*. The via-hole conductor v14 connects the dummy lead-out conductors 20*d* and 20*e*. The via-hole conductor v15 connects the dummy lead-out conductor 20*e* and the lead-out conductor 22. The via-hole conductor v16 connects the lead-out conductor 22 and the dummy lead-out conductor 20*f*. The via-hole conductor v17 connects the dummy lead-out conductors 20*f* and 20*g*. As a result, the lead-out conductor 22 and the dummy lead-out conductors 20*a* to 20*g* are connected.

The via-hole conductors v18 to v24 are provided so as to pierce through the insulator layers 16*b* to 16*h*, respectively, in the y-axis direction, and overlap one another in a plan view in the y-axis direction. The via-hole conductor v18 connects the dummy lead-out conductors 24*a* and 24*b*. The via-hole conductor v19 connects the dummy lead-out conductor 24*b* and the lead-out conductor 26. The via-hole conductor v20 connects the lead-out conductor 26 and the dummy lead-out conductor 24*c*. The via-hole conductor v21 connects the dummy lead-out conductors 24*c* and 24*d*. The via-hole conductor v22 connects the dummy lead-out conductors 24*d* and 24*e*. The via-hole conductor v23 connects the dummy lead-out conductors 24*e* and 24*f*. The via-hole conductor v24 connects the dummy lead-out conductors 24*f* and 24*g*. As a result, the lead-out conductor 26 and the dummy lead-out conductors 24*a* to 24*g* are connected.

The external electrode 14*a* is formed by directly plating the formation area A1 at the bottom surface S1 of the laminate 12, so as to cover the dummy lead-out conductors 20*a* to 20*g* and the lead-out conductor 22 at the bottom surface S1, as shown in FIG. 3B. The external electrode 14*b* is formed by directly plating the formation area A2 at the bottom surface S1 of the laminate 12, so as to cover the dummy lead-out conductors 24*a* to 24*g* and the lead-out conductor 26 at the bottom surface S1, as shown in FIG. 3B. The external electrodes 14*a* and 14*b* have the same rectangular shape as the formation areas A1 and A2, respectively, and do not extend to the side surfaces S3 and S4 and the end surfaces S5 and S6, which are adjacent to the bottom surface S1. Moreover, the external electrode 14*a* is positioned on the positive side in the x-axis direction relative to the external electrode 14*b*. Examples of the materials of the external electrodes 14*a* and 14*b* include Cu, Ni, and Sn.

The electronic component 10 thus configured has features as will be described below, in the cross section shown in FIG. 4, which is normal to the x-axis direction and includes the lead-out conductor 22, the dummy lead-out conductors 20*a* to 20g, and the coil conductors 18*a* to 18*d*. First, a portion of the cross section that includes the lead-out conductor 22 and the dummy lead-out conductors 20*a* to 20*g* will be referred to as a cross-sectional region E1. The rest of the cross section other than the cross-sectional region E1, which includes the coil conductors 18*a* to 18*d*, will be referred to as a cross-sectional region E2. The cross-sectional region E1 is a region between the bottom surface S1 and a line L1 parallel to the y-axis and dividing the dummy lead-out conductors 20*a* to 20*g* and the lead-out conductor 22 from the coil conductors 18*a* to 18*d*. The cross-sectional region E2 is a region between the top surface S2 and the line L1.

As shown in FIG. 4, the proportion of an area occupied by the lead-out conductor 22 and the dummy lead-out conductors 20*a* to 20*g* in the cross-sectional region E1 is greater than the proportion of an area occupied by the coil conductors 18*a* to 18*d* in the cross-sectional region E2.

Furthermore, in a cross section not shown in the figure, a portion of the cross section that includes the lead-out conductor 26 and the dummy lead-out conductors 24*a* to 24*g* will be referred to as a cross-sectional region E1. The rest of the cross section other than the cross-sectional region E1, which includes the coil conductors 18*a* to 18*d*, will be referred to as a cross-sectional region E2. The cross-sectional region E1 is a region between the bottom surface S1 and a line L1 extending on the positive side in the z-axis direction relative to a line connecting the ends of the dummy lead-out conductors 24*a* to 24*g* and the lead-out conductor 26 on the positive side in the z-axis direction. The cross-sectional region E2 is a region between the top surface S2 and the line L1.

The proportion of an area occupied by the lead-out conductor 26 and the dummy lead-out conductors 24*a* to 24*g* in the cross-sectional region E1 is greater than the proportion of an area occupied by the coil conductors 18*a* to 18*d* in the cross-sectional region E2.

Furthermore, in the electronic component 10, the formation areas A1 and A2, when viewed in a plan view in an extended direction (x-axis direction) in which the long sides of the insulator layers 16*a* to 16*j* that constitute the bottom surface S1 extend, are curved so as to bulge at the center toward the negative side in the z-axis direction relative to the opposite ends, as shown in FIG. 4. In the electronic component 10 according to the present embodiment, the bottom surface S1, when viewed in a plan view in the x-axis direction, is curved so as to bulge at the center toward the negative side in the z-axis direction relative to the opposite ends. The amount of curving D of the bottom surface S1 refers to the distance in the z-axis direction from the level of the most bulging point of the bottom surface S1 (typically, the center of the bottom surface S1 in the y-axis direction) to the level of the opposite ends of the bottom surface S1 in the y-axis direction, as shown in FIG. 4.

Furthermore, the external electrodes 14*a* and 14*b* are provided in the formation areas A1 and A2, respectively. Therefore, the external electrodes 14*a* and 14*b*, when viewed in a plan view in the x-axis direction, are also curved so as to bulge at the center toward the negative side in the z-axis direction relative to the opposite ends.

Method for Producing Electronic Component: The method for producing the electronic component 10 will be described below with reference to the drawings. Note that in the method described below, a plurality of electronic components 10 are produced simultaneously.

Initially, ceramic green sheets from which to make insulator layers 16*a* to 16*j* of FIG. 2 are prepared. Specifically, materials weighed at a predetermined ratio, including ferric oxide ($Fe_2O_3$), zinc oxide (ZnO), copper oxide (CuO), and nickel oxide (NiO), are introduced into a ball mill as raw materials, and subjected to wet mixing. The resultant mixture is dried and ground to obtain powder, which is pre-sintered at 800° C. for 1 hour. The resultant pre-sintered powder is subjected to wet grinding in the ball mill, and thereafter dried and cracked to obtain ferrite ceramic powder having an average grain size of 2 μm.

To the ferrite ceramic powder, a binder (vinyl acetate, water-soluble acrylic, or the like), a plasticizer, a wetting agent, and a dispersing agent are added and mixed in the ball mill, and thereafter defoamed under reduced pressure. The resultant ceramic slurry is spread over carrier sheets by a doctor blade method and dried to form ceramic green sheets from which to make insulator layers 16*a* to 16*j*.

Next, via-hole conductors v1 to v24 are provided through their respective ceramic green sheets from which to make insulator layers 16*b* to 16*h*. Specifically, the ceramic green sheets from which to make insulator layers 16*b* to 16*h* are irradiated with laser beams to bore via holes therethrough. In addition, a paste made of a conductive material such as Ag, Pd, Cu, Au, or an alloy thereof, is applied by printing or suchlike to fill the via holes.

Next, coil conductors 18*a* to 18*d*, dummy lead-out conductors 20*a* to 20*g* and 24*a* to 24*g*, and lead-out conductors 22 and 26 are formed in the principal surfaces (hereinafter, referred to as the front faces) of the ceramic green sheets from which to make insulator layers 16*b* to 16*i*, on the negative side in the z-axis direction, as shown in FIG. 2. Specifically, a conductive paste mainly composed of Ag, Pd, Cu, Au, or an alloy thereof is applied by screen printing or photolithography onto the front faces of the ceramic green sheets from which to make insulator layers 16*b* to 16*i*, thereby forming the coil conductors 18*a* to 18*d*, the dummy lead-out conductors 20*a* to 20*g* and 24*a* to 24*g*, and the lead-out conductors 22 and 26. Note that forming the coil conductors 18*a* to 18*d*, the dummy lead-out conductors 20*a* to 20*g* and 24*a* to 24*g*, and the lead-out conductors 22 and 26 and filling the via holes with the conductive paste may be included in the same step.

Next, the ceramic green sheets from which to make insulator layers 16*a* to 16*j* are laminated in this order, as shown in FIG. 2, and then subjected to pressure-bonding, thereby obtaining an unsintered mother laminate. In the lamination and the pressure-bonding of the ceramic green sheets from which to make insulator layers 16*a* to 16*j*, the sheets are laminated one by one and then subjected to pressure-bonding to obtain the unsintered mother laminate, and thereafter, the mother laminate is firmly bonded by pressing with an isostatic press or suchlike.

Next, the mother laminate is cut by a cutter into a predetermined size, thereby obtaining unsintered laminates 12. Each of the unsintered laminates 12 is subjected to debinding and sintering. The debinding is performed, for example, in a low-oxygen atmosphere at 500° C. for two hours. The sintering is performed, for example, at 800° C. to 900° C. for 2.5 hours.

During the sintering, the insulator layers 16*a* to 16*j*, the coil conductors 18*a* to 18*d*, the dummy lead-out conductors 20*a* to 20*g* and 24*a* to 24*g*, and the lead-out conductors 22 and 26 contract. The degree of contraction of the insulator layers 16*a* to 16*j*, which are made of ceramic, is greater than the degree of contraction of the coil conductors 18*a* to 18*d*, the dummy lead-out conductors 20*a* to 20*g* and 24*a* to 24*g*, and the lead-out conductors 22 and 26, which are made of conductive materials. Therefore, the cross-sectional region E2, which has a relatively small proportion of conductive material, contracts more than the cross-sectional region E1, which has a relatively large proportion of conductive material. Accordingly, the width of the cross-sectional region E2 in the y-axis direction is less than the width of the cross-sectional region E1 in the y-axis direction, as shown in FIG. 4. Therefore, the opposite ends of the cross-sectional region E2 in the y-axis direction are pulled upward in the z-axis direction. As a result, the bottom surface S1 is curved so as to bulge at the center toward the negative side in the z-axis direction relative to the opposite ends.

Next, the laminate 12 is barreled for beveling, and plated with Ni and Sn, thereby forming external electrodes 14*a* and 14*b*. Specifically, the dummy lead-out conductors 20*a* to 20*g* and 24*a* to 24*g*, and the lead-out conductors 22 and 26 are exposed from the bottom surface S1 of the laminate 12. Accordingly, conductive films are grown from the dummy lead-out conductors 20*a* to 20*g* and 24*a* to 24*g*, and the lead-out conductors 22 and 26 by a plating method, thereby forming the external electrodes 14*a* and 14*b*, as shown in FIG. 3B. By the foregoing process, the electronic component 10 as shown in FIG. 1 is completed.

Effects: The electronic component 10 according to the present embodiment renders it possible to inhibit air from being left trapped in the solder that connects the lands of the circuit board to the external electrodes 14*a* and 14*b*. More specifically, the laminated coil component 100 described in Japanese Patent Laid-Open Publication No. 2005-322743 has the external electrodes 130 provided only on the mounting surface and in the form of flat plates. When the laminated coil component 100 is mounted onto a circuit board, if air is trapped in the solder, it is caught between the external electrodes 130 and the lands, so that it cannot escape from the solder. In this manner, when air remains in the solder, there might be poor connections between the lands and the external electrodes 130.

Therefore, the electronic component 10 has the formation areas A1 and A2 curved so as to bulge at the center relative to the opposite ends in a plan view in the x-axis direction, as shown in FIG. 4. As a result, the external electrodes 14*a* and 14*b*, when viewed in a plan view in the x-axis direction, are also curved so as to bulge at the center toward the negative side in the z-axis direction relative to the opposite ends. Accordingly, when the external electrodes 14*a* and 14*b* are soldered to the lands, the gap between the lands and the opposite ends of the external electrodes 14*a* and 14*b* in the y-axis direction is greater than the gap between the lands and the centers of the external electrodes 14*a* and 14*b* in the y-axis direction. Therefore, even if air is caught between the lands and the external electrodes 14*a* and 14*b*, it can escape from the solder readily. As a result, the electronic component 10 renders it possible to inhibit air from being left trapped in the solder that connects the lands of the circuit board and the external electrodes 14*a* and 14*b*.

Furthermore, the electronic component 10 prevents itself from being mounted on the circuit board in a tilted state. More specifically, in the electronic component 10, the formation areas A1 and A2, when viewed in a plan view in the x-axis direction, are curved so as to bulge at the center relative to the opposite ends, as shown in FIG. 4. As a result, the external electrodes 14*a* and 14*b*, when viewed in a plan view in the x-axis direction, are also curved so as to bulge at the center toward the negative side in the z-axis direction relative to the opposite ends. Accordingly, when the external electrodes 14*a* and 14*b* are soldered to the lands, the gap between the lands and the opposite ends of the external electrodes 14*a* and 14*b* in the y-axis direction is greater than the gap between the lands and the centers of the external electrodes 14*a* and 14*b* in the y-axis direction. That is, the electronic component 10 has more solder between the lands and the opposite ends of the external electrodes 14*a* and 14*b* in the y-axis direction when compared to solder between the lands and the external electrodes in an electronic component whose mounting surface is not curved. Accordingly, the surface tension of the solder that pulls the external electrodes 14*a* and 14*b* toward the circuit board in the electronic component 10 is greater than the surface tension of the solder that pulls the external electrodes toward the circuit board in an electronic component whose mounting surface is not curved. Therefore, the external electrodes 14*a* and 14*b* are stably attached to the lands. As a result, the electronic component 10 is prevented from being mounted on the circuit board in a tilted state.

The electronic component 10 has features as will be described below to have the bottom surface S1 curved in a plan view in the x-axis direction. More specifically, the degree of contraction of the insulator layers 16*a* to 16*j*, which are made of ceramic, is greater than the degree of contraction of the coil conductors 18*a* to 18*d*, the dummy lead-out conductors 20*a* to 20*g* and 24*a* to 24*g*, and the lead-out conductors 22 and 26, which are made of conductive materials. The proportion of an area occupied by the lead-out conductor 22, or 26, and the dummy lead-out conductors 22*a* to 22*g*, or 24*a* to 24*g*, in the cross-sectional region E1 is greater than the proportion of an area occupied by the coil conductors 18*a* to 18*d* in the cross-sectional region E2, as shown in FIG. 4. Accordingly, the cross-sectional region E2, which has a relatively small proportion of conductive material, contracts more than the cross-sectional region E1, which has a relatively large proportion of conductive material. Accordingly, the width of the cross-sectional region E2 in the y-axis direction is less than the width of the cross-sectional region E1 in the y-axis direction, as shown in FIG. 4. Therefore, the opposite ends of the cross-sectional region E2 in the y-axis direction are pulled upward in the z-axis direction. As a result, the bottom surface S1 is curved so as to bulge at the center toward the negative side in the z-axis direction relative to the opposite ends.

Furthermore, in the electronic component 10, the dummy lead-out conductors 20*a*, 20*b*, 24*a*, and 24*b* and the dummy lead-out conductors 20*f*, 20*g*, 24*f*, and 24*g* are provided outside in the y-axis direction (i.e., either on the positive side or the negative side in the y-axis direction) relative to the terminals t1 and t2 of the coil L. Accordingly, there is a more significant difference in the degree of contraction in the y-axis direction between the cross-sectional regions E1 and E2. As a result, in the electronic component 10, the bottom surface S1 has a larger amount of curving D.

Furthermore, the width of the cross-sectional region E1 in the y-axis direction is larger by the thickness of the dummy lead-out conductors 20*a* and 20*b*, or 24*a* and 24*b*, and the dummy lead-out conductors 20*f* and 20*g*, or 24*f* and 24*g*. Accordingly, there is an increase in the difference between the width of the cross-sectional region E1 in the y-axis direction and the width of the cross-sectional region E2 in the y-axis direction. Therefore, the opposite ends of the cross-sectional region E2 in the y-axis direction are more strongly pulled upward in the z-axis direction. As a result, in the electronic component 10, the bottom surface S1 has a larger amount of curving D.

Furthermore, in the electronic component 10, the dummy lead-out conductors 20*c* to 20*e* and 24*c* to 24*e* are provided inside in the y-axis direction relative to the terminals t1 and t2 of the coil L. Accordingly, there is a more significant difference in the degree of contraction in the y-axis direction between the cross-sectional regions E1 and E2. As a result, in the electronic component 10, the bottom surface S1 has a larger amount of curving D.

Furthermore, in the electronic component 10, the lead-out conductors 22 and 26 and the dummy lead-out conductors 20*a* to 20*f* and 24*a* to 24*f* are thicker than the coil conductors 18*a* to 18*d*, as shown in FIG. 4. Therefore, the proportion of an area occupied by the lead-out conductor 22, or 26, and the dummy lead-out conductors 22*a* to 22*g*, or 24*a* to 24*g*, in the cross-sectional region E1 can be rendered greater than the proportion of an area occupied by the coil conductors 18*a* to 18*d* in the cross-sectional region E2. As a result, in the electronic component 10, the bottom surface S1 has a larger amount of curving D.

Figure 5:
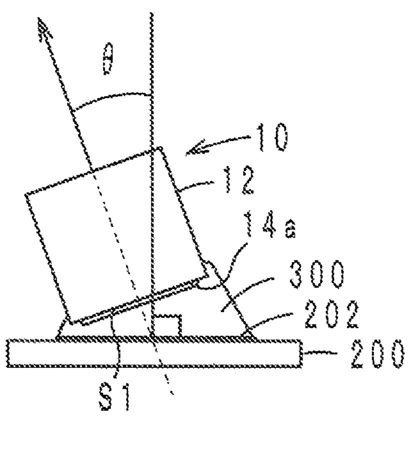
FIG. 5 is a diagram illustrating an electronic component mounted on a circuit board.

To clearly demonstrate that the electronic component 10 is prevented from being mounted on the circuit board in a tilted state, the present inventor conducted the experimentation as will be described below. FIG. 5 is a diagram illustrating an electronic component 10 mounted on a circuit board 200.

The present inventor produced electronic components 10 with specifications shown below as first through fourteenth samples, with one electronic component for each sample. Table 1 shows the amount of curving D for each of the first through fourteenth samples. The amounts of curving D were measured by the length measurement function of a digital microscope VHX-500 from KEYENCE Corp. after observing cross sections of the first through fourteenth samples at a magnification of 500 times using the microscope.

Chip size: 0603 size (0.6 mm×0.3 mm)

Electrode size: 0.15 mm×0.28 mm

TABLE 1

| | AMOUNT OF CURVING D(μm) |
|---|---|
| 1ST SAMPLE | 0.08 |
| 2ND SAMPLE | 0.15 |
| 3RD SAMPLE | 0.23 |
| 4TH SAMPLE | 0.57 |
| 5TH SAMPLE | 0.98 |
| 6TH SAMPLE | 1.88 |
| 7TH SAMPLE | 3.25 |
| 8TH SAMPLE | 3.99 |

TABLE 1-continued

| | AMOUNT OF CURVING D(μm) |
|---|---|
| 9TH SAMPLE | 6.91 |
| 10TH SAMPLE | 8.14 |
| 11TH SAMPLE | 11.75 |
| 12TH SAMPLE | 12.5 |
| 13TH SAMPLE | 15.15 |
| 14TH SAMPLE | 18.25 |

The present inventor mounted the first through fourteenth samples onto circuit boards 200 by joining external electrodes 14*a* and 14*b* to lands 202 with solder 300, as shown in FIG. 5. Thereafter, the inclination θ of the electronic component 10 relative to the circuit board 200 was measured. The inclination θ is an angle of a normal to the bottom surface S1 with respect to a normal to the circuit board 200, as shown in FIG. 5. The inclination θ was measured by a CNC video measuring system NEXIV (model: VMR-3020, manufactured by Nikon Corp.). Table 2 shows the experimentation results.

TABLE 2

| | INCLINATION θ (°) |
|---|---|
| 1ST SAMPLE | 5.9 |
| 2ND SAMPLE | 4.9 |
| 3RD SAMPLE | 4.6 |
| 4TH SAMPLE | 3.3 |
| 5TH SAMPLE | 2.5 |
| 6TH SAMPLE | 2.3 |
| 7TH SAMPLE | 2.2 |
| 8TH SAMPLE | 2 |
| 9TH SAMPLE | 1.8 |
| 10TH SAMPLE | 1.6 |
| 11TH SAMPLE | 1.7 |
| 12TH SAMPLE | 1.7 |
| 13TH SAMPLE | 1.7 |
| 14TH SAMPLE | 1.8 |

From Table 2, it can be appreciated that the inclination θ decreases as the amount of curving D increases. Thus, it can be appreciated that curving the bottom surface S1 prevents the electronic component 10 from being mounted on the circuit board 200 in a tilted state.

Furthermore, after the mounting of the electronic component 10, a visual inspection is carried out through image processing in order to confirm whether the electronic component 10 is mounted at a normal position and with a normal attitude. At this time, if the inclination θ is 5° or more, the side surface S3 or the side surface S4 of the electronic component 10, along with the top surface S2, is measured so that the electronic component 10 is determined to be mounted poorly. Therefore, the inclination θ is preferably less than 5°. The inclination θ for the first sample with an amount of curving D of 0.08 μm was 5.9°, and the inclination θ for the second sample with an amount of curving D of 0.15 μm was 4.9°. Accordingly, the amount of curving D is preferably 0.15 μm or more.

Figure 6A:
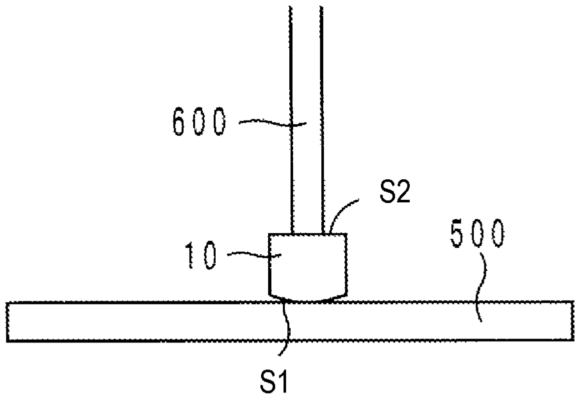
FIGS. 6A and 6B are diagrams each illustrating the electronic component sucked by a nozzle.
Figure 6B:
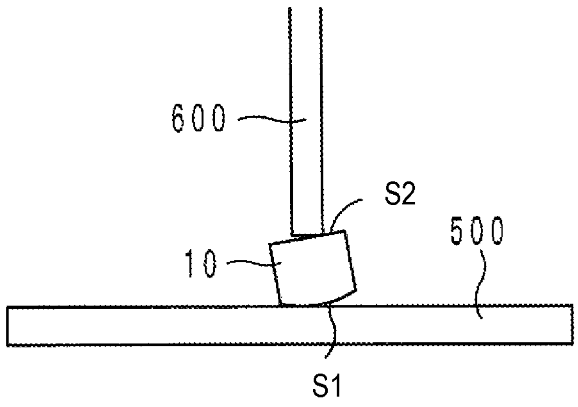

Furthermore, given that the electronic component 10 is sucked by a nozzle, the amount of curving D is preferably 12.5 μm or less. FIGS. 6A and 6B are diagrams each illustrating the electronic component 10 sucked by a nozzle 600.

The electronic component 10 is affixed to a taping mount 500, as shown in FIG. 6A. In mounting the electronic component 10, the electronic component 10 is sucked at the top surface S2 by the nozzle 600, and detached from the taping mount 500.

Here, if the amount of curving D of the bottom surface S1 is excessively increased, the electronic component 10 might be tilted on the taping mount 500, as shown in FIG. 6B. As a result, it might be difficult to suck the top surface S2 of the electronic component 10 by the nozzle 600. In the experimentation by the present inventor, there was no suction error for the twelfth sample having an amount of curving D of 12.5 but a suction error occurred for the thirteenth sample having an amount of curving D of 15.15 μm. Therefore, from the viewpoint of preventing a suction error, the amount of curving D is preferably 12.5 μm or less.

Figure 7:
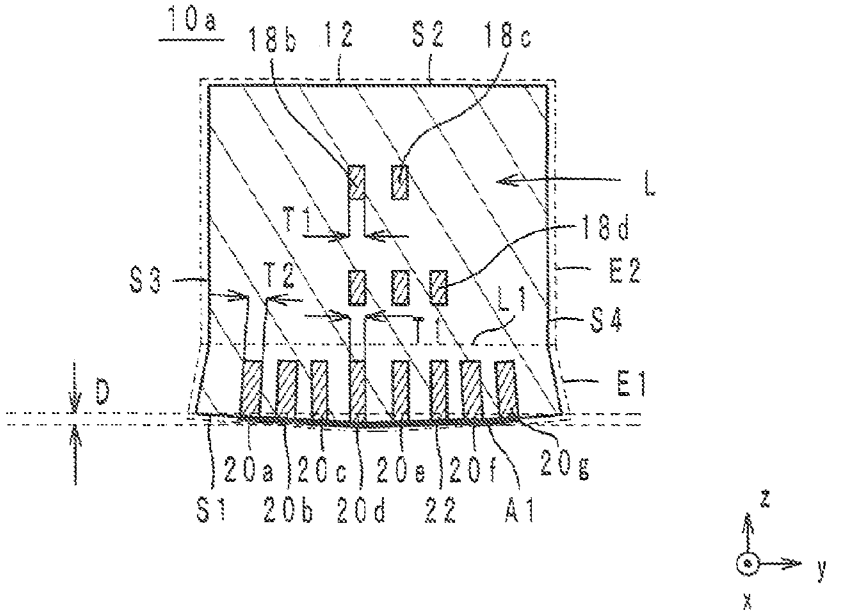
FIG. 7 is a cross-sectional structure view of an electronic component according to a first exemplary modification.

First Modification: Hereinafter, an electronic component 10*a* according to a first exemplary modification will be described with reference to the drawings. FIG. 7 is a cross-sectional structure view of the electronic component 10*a* according to the first modification. For the external oblique view of the electronic component 10*a*, FIG. 3 will be referenced.

In the electronic component 10*a*, the thickness T2 of the dummy lead-out conductors 20*a*, 20*b*, 20*f*, 20*g*, 24*a*, 24*b*, 24*f*, and 24*g* provided outside in the y-axis direction relative to the terminals t1 and t2 of the coil L is greater than the thickness T1 of the dummy lead-out conductors 20*c* to 20*e* and 24*c* to 24*e* and the lead-out conductors 22 and 26 provided inside in the y-axis direction relative to the terminals t1 and t2. In addition, the thickness of the coil conductors 18*a* to 18*d* is equal to the thickness T1 of the dummy lead-out conductors 20*c* to 20*e* and 24*c* to 24*e* and the lead-out conductors 22 and 26.

In the electronic component 10*a* as above, the thickness T2 of the dummy lead-out conductors 20*a*, 20*b*, 20*f*, 20*g*, 24*a*, 24*b*, 24*f*, and 24*g* is greater than the thickness T1 of the coil conductors 18*a* to 18*d*. Accordingly, the proportion of an area occupied by the lead-out conductor 22, or 26, and the dummy lead-out conductors 22*a* to 22*g*, or 24*a* to 24*g*, in the cross-sectional region E1 can be rendered greater than the proportion of an area occupied by the coil conductors 18*a* to 18*d* in the cross-sectional region E2. As a result, in the electronic component 10*a*, the bottom surface S1 has a larger amount of curving D.

Furthermore, in the electronic component 10*a*, the dummy lead-out conductors 20*c* to 20*e* and 24*c* to 24*e* and the lead-out conductors 22 and 26 have the same thickness T1 as the coil conductors 18*a* to 18*d*. Accordingly, among the dummy lead-out conductors 20*c* to 20*e* and 24*c* to 24*e*, the lead-out conductors 22 and 26, and the coil conductors 18*a* to 18*d*, any conductors that are to be formed on the same insulator layer 16 can be formed simultaneously by screen printing. As a result, the number of production steps for the electronic component 10*a* can be reduced.

Figure 8:
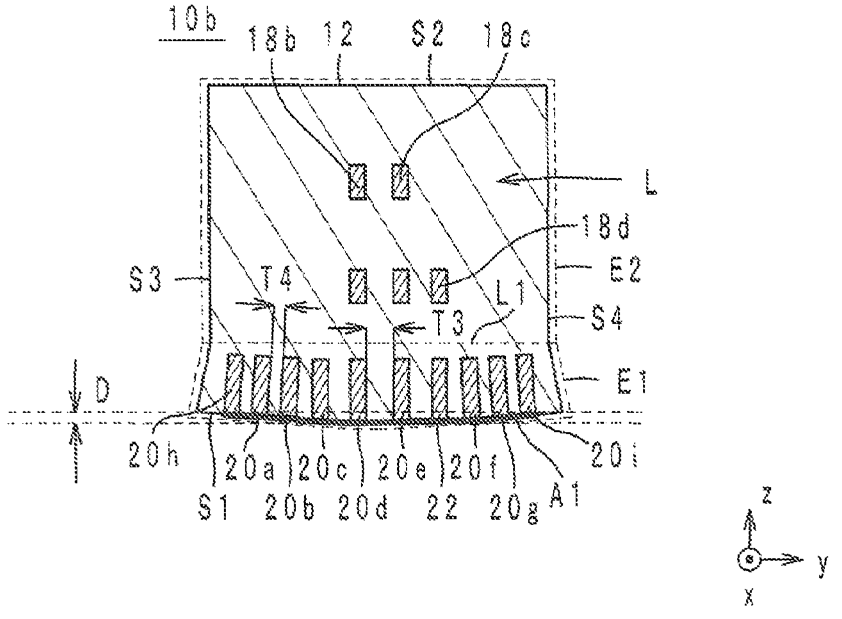
FIG. 8 is a cross-sectional structure view of an electronic component according to a second exemplary modification.

Second Modification: Hereinafter, an electronic component 10*b* according to a second exemplary modification will be described with reference to the drawings. FIG. 8 is a cross-sectional structure view of the electronic component 10*b* according to the second modification. For the external oblique view of the electronic component 10*b*, FIG. 3 will be referenced.

In the electronic component 10*b*, the thickness T4 of the insulator layers 16*a* to 16*c* and 16*g* to 16*j* provided outside in the y-axis direction relative to the terminals t1 and t2 of the coil L is less than the thickness T3 of the insulator layers 16*d* to 16*f* provided inside in the y-axis direction relative to the terminals t1 and t2.

In the electronic component 10*b* as above, since the thickness T4 of the insulator layers 16*a* to 16*c*, 16*g* to 16*j* is small, the proportion of an area occupied by the dummy lead-out conductors 20*a*, 20*b*, 20*e*, and 20*f*, or 24*a*, 24*b*, 24*e*, and 24*f*, outside the terminals t1 and t2 of the coil L within the cross-sectional region E1 increases. Accordingly, portions outside the terminals t1 and t2 of the coil L within the cross-sectional region E1 become more resistant to contraction. As a result, in the electronic component 10*b*, the bottom surface S1 has a larger amount of curving D.

Figure 9:
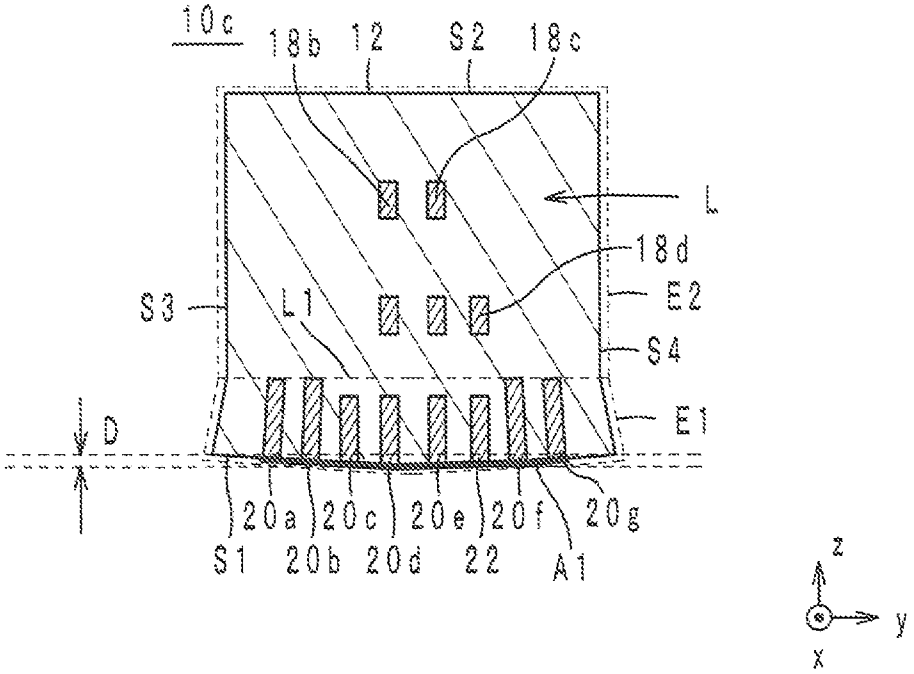
FIG. 9 is a cross-sectional structure view of an electronic component according to a third exemplary modification.

Third Modification: Hereinafter, an electronic component 10*c* according to a third exemplary modification will be described with reference to the drawings. FIG. 9 is a cross-sectional structure view of the electronic component 10*c* according to the third modification. For the external oblique view of the electronic component 10*c*, FIG. 3 will be referenced.

In the electronic component 10*c*, the height from the bottom surface S1 to the top of the dummy lead-out conductors 20*a*, 20*b*, 20*f*, 20*g*, 24*a*, 24*b*, 24*f*, and 24*g* provided outside in the y-axis direction relative to the terminals t1 and t2 of the coil L is higher than the height from the bottom surface S1 to the top of the dummy lead-out conductors 20*c* to 20*e* and 24*c* to 24*e* and the lead-out conductors 22 and 26 provided inside in the y-axis direction relative to the terminals t1 and t2.

Also in the electronic component 10*c* as above, the proportion of an area occupied by the dummy lead-out conductors 20*a*, 20*b*, 20*e*, and 20*f*, or 24*a*, 24*b*, 24*e*, and 24*f*, outside the terminals t1 and t2 of the coil L within the cross-sectional region E1 increases. Accordingly, portions outside the terminals t1 and t2 of the coil L within the cross-sectional region E1 become more resistant to contraction. As a result, in the electronic component 10*c*, the bottom surface S1 has a larger amount of curving D.

Figure 10A:
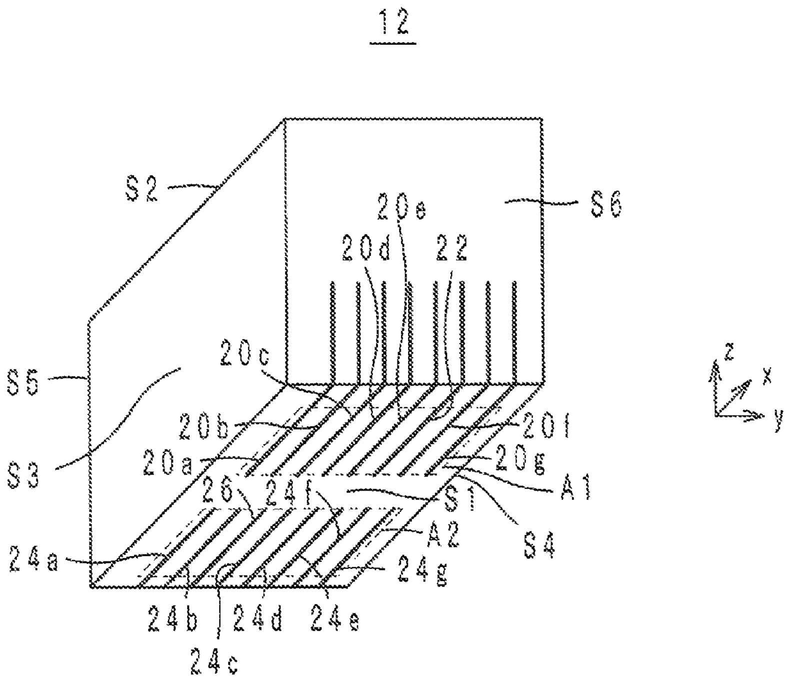
FIG. 10A is an external oblique view of a laminate in an electronic component according to a fourth exemplary modification.
Figure 10B:
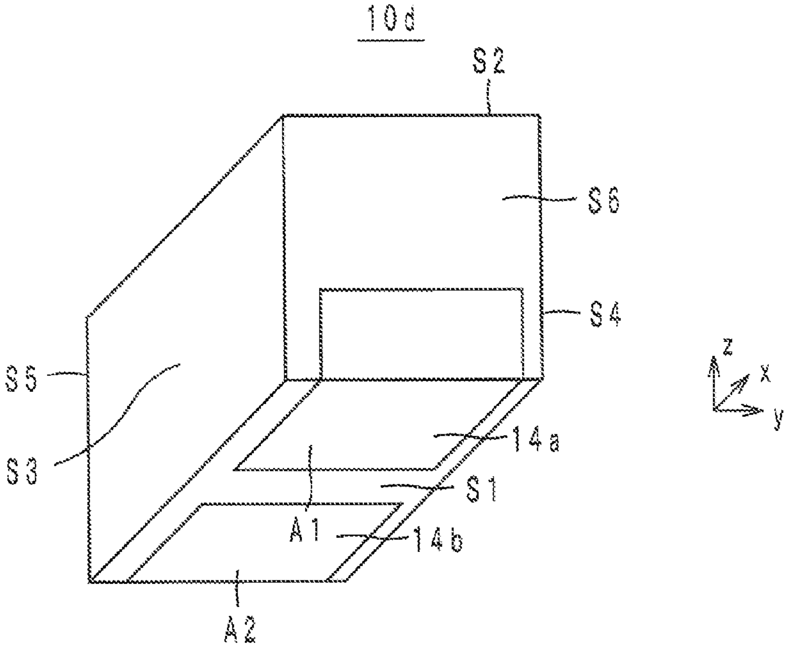
FIG. 10B is an external oblique view of the electronic component according to the fourth exemplary modification.

Fourth Modification: Hereinafter, an electronic component 10*d* according to a fourth exemplary modification will be described with reference to the drawings. FIG. 10A is an external oblique view of a laminate 12 in the electronic component 10*d* according to the fourth modification. FIG. 10B is an external oblique view of the electronic component 10*d* according to the fourth modification.

In the electronic component 10*d*, the lead-out conductor 22 and the dummy lead-out conductors 20*a* to 20*g* are exposed at the end surface S6. As a result, the external electrode 14*a* extends in an L-like shape across the bottom surface S1 and the end surface S6.

Furthermore, the lead-out conductor 26 and the dummy lead-out conductors 24*a* to 24*g* are exposed at the end surface S5. As a result, the external electrode 14*b* extends in an L-like shape across the bottom surface S1 and the end surface S5.

In the electronic component 10*d* as above, solder adheres to the part of the external electrode 14*a* that is provided on the side surface S6 and the part of the external electrode 14*b* that is provided on the side surface S5. Accordingly, the surface tension of the solder that pulls the electronic component 10*d* toward the circuit board is greater than the surface tension of the solder that pulls the electronic component 10 toward the circuit board. As a result, the electronic component 10*d* can be mounted on the circuit board more firmly.

Note that the external electrodes 14*a* and 14*b* may be formed so as to extend to the side surfaces S3 and S4, as well.

Figure 11A:
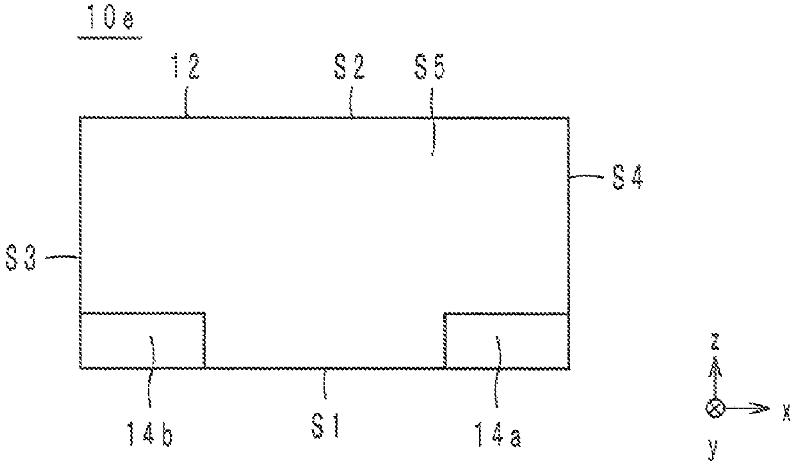
FIGS. 11A, 11B, and 11C are plan views of an electronic component according to a fifth exemplary modification.
Figure 11B:
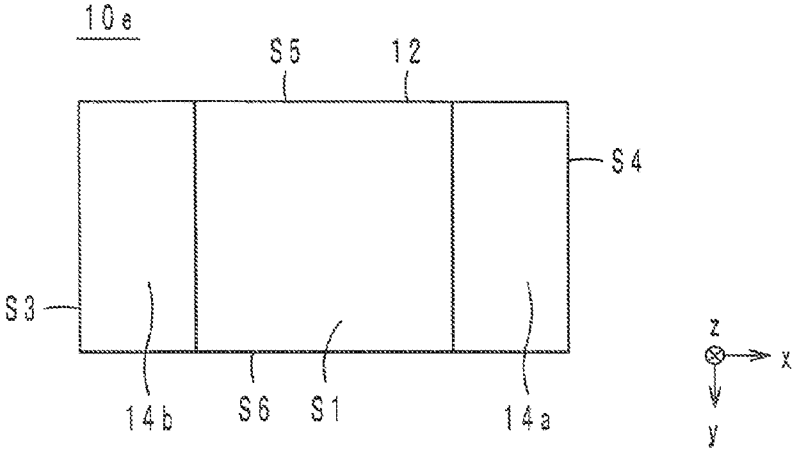
Figure 11C:
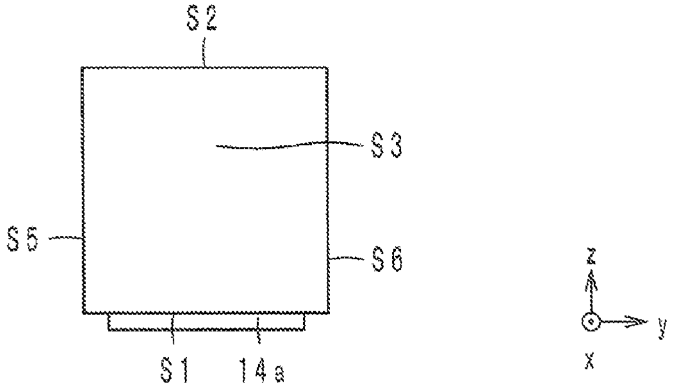
Figure 12:
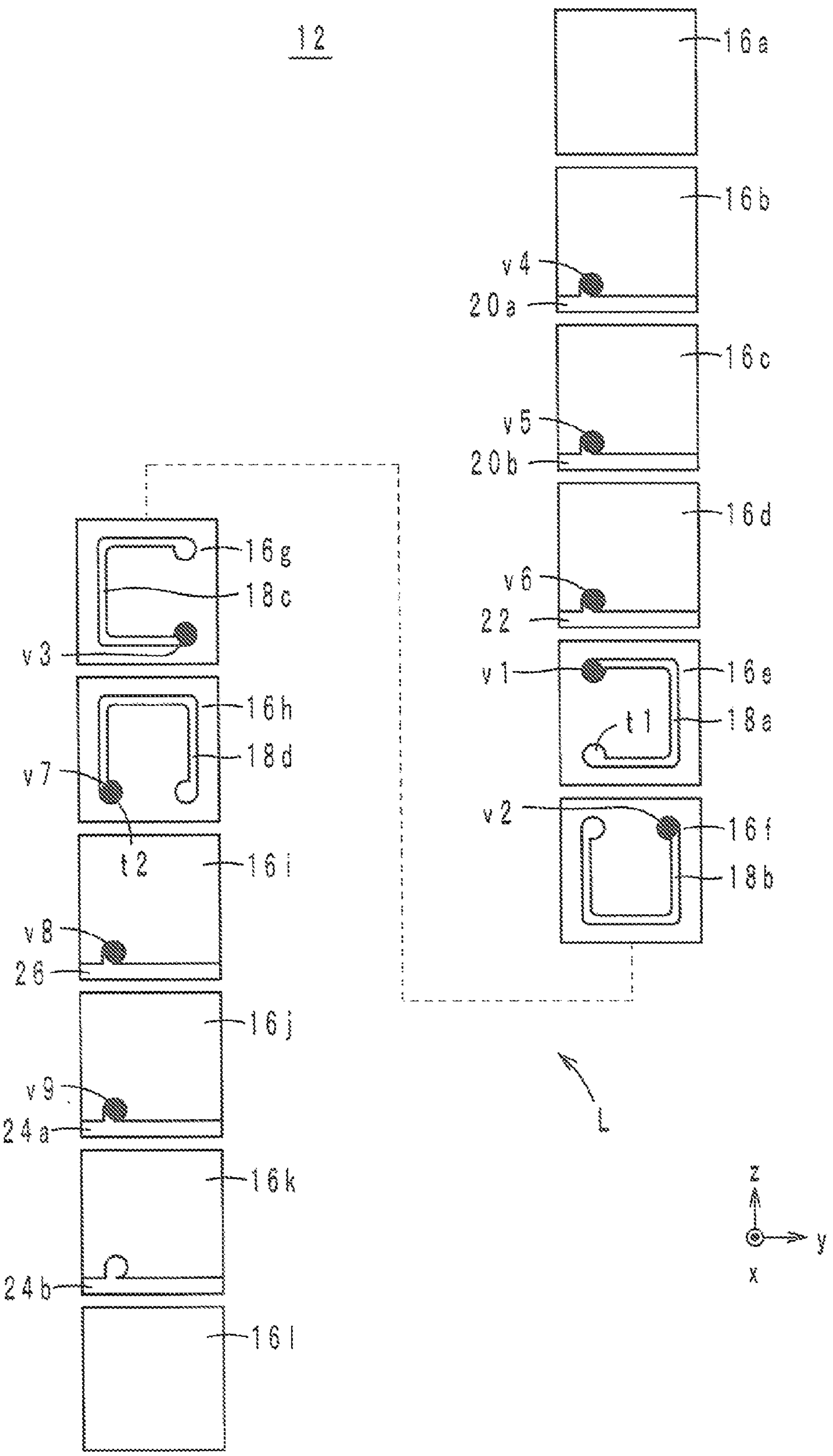
FIG. 12 is an exploded view of a laminate in the electronic component according to the fifth exemplary modification.
Figure 13A:
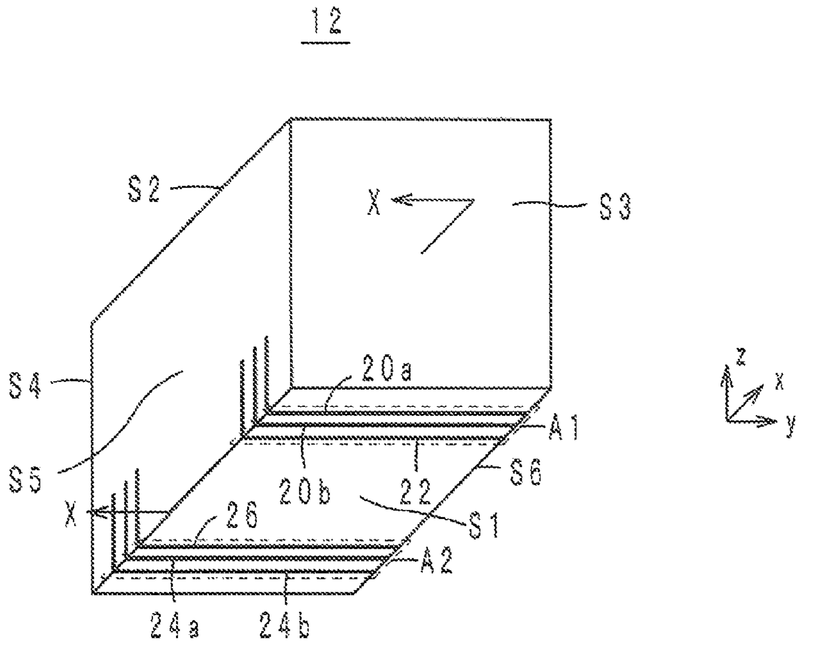
FIG. 13A is an external oblique view of the laminate in the electronic component according to the fifth exemplary modification.
Figure 13B:
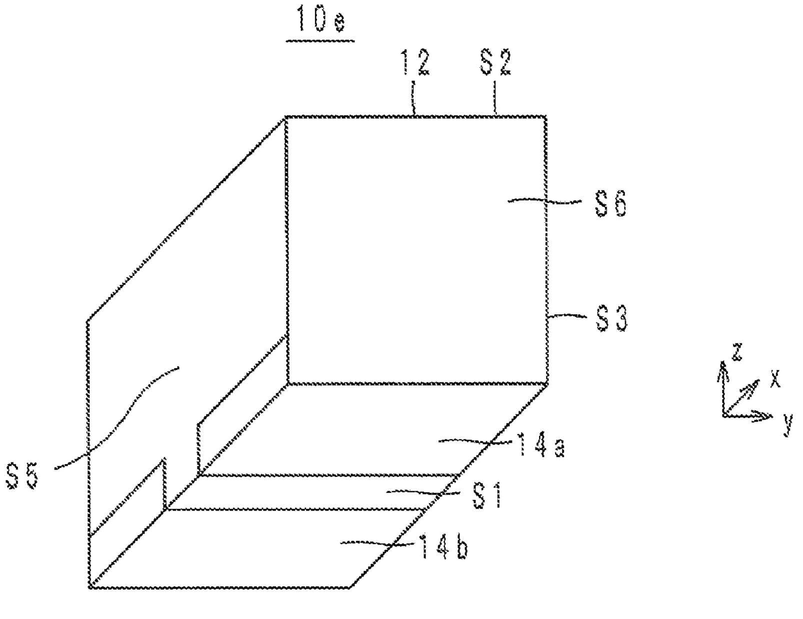
FIG. 13B is an external oblique view of the electronic component according to the fifth exemplary modification.
Figure 14:
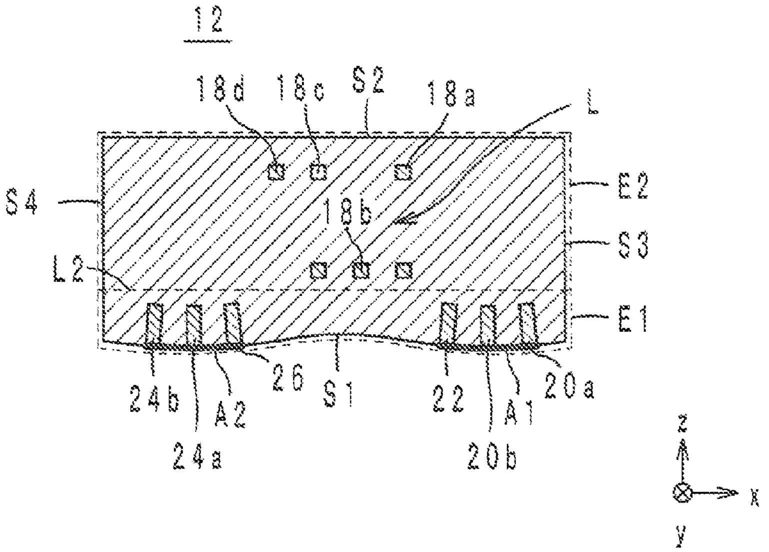
FIG. 14 is a cross-sectional structure view taken along line X-X of FIG. 13A.
Figure 15:
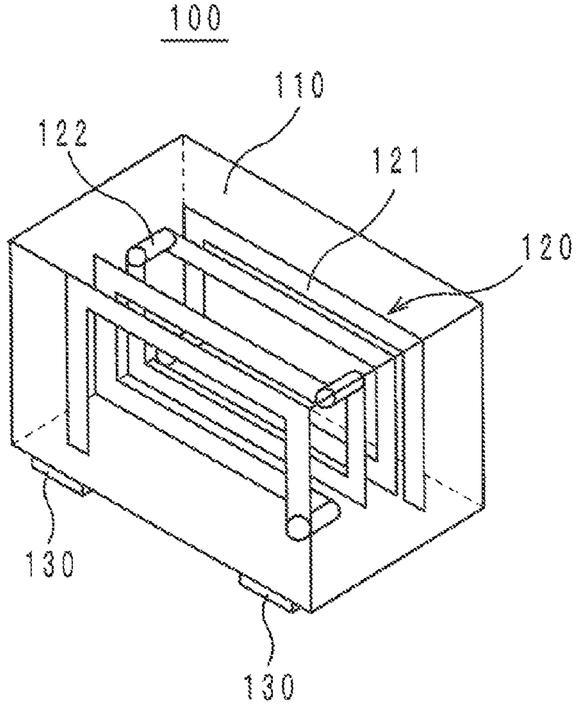
FIG. 15 PRIOR ART
FIG. 15 is a perspective view of a laminated coil component described in Japanese Patent Laid-Open Publication No. 2005-322743.

Fifth Modification: Hereinafter, an electronic component 10*e* according to a fifth exemplary modification will be described with reference to the drawings. FIGS. 11A, 11B, and 11C are plan views of the electronic component 10*e* according to the fifth modification. FIG. 12 is an exploded view of a laminate 12 in the electronic component 10*e* according to the fifth modification. FIG. 13A is an external oblique view of the laminate 12 in the electronic component 10*e* according to the fifth modification. FIG. 13B is an external oblique view of the electronic component 10*e* according to the fifth modification. FIG. 14 is a cross-sectional structure view taken along line X-X of FIG. 13A. In FIG. 14, external electrodes 14*a* and 14*b* are not shown. In the following, the direction of lamination of the electronic component 10*e* will be defined as an x-axis direction, the top-bottom direction in a plan view in the x-axis direction will be defined as a z-axis direction, and the left-right direction in a plan view in the x-axis direction will be defined as a y-axis direction. The x-, y-, and z-axes are perpendicular to one another.

The electronic component 10*e* includes the laminate 12, the external electrodes 14*a* and 14*b*, dummy lead-out conductors 20*a*, 20*b*, 24*a*, and 24*b*, lead-out conductors 22 and 26, a coil L, and via-hole conductors v4 to v9, as shown in FIGS. 11A, 11B, 11C, and 12.

The laminate 12 is in the shape of a rectangular solid, and has the coil L provided therein. The laminate 12 has a bottom surface S1, a top surface S2, side surfaces S3 and S4, and end surfaces S5 and S6. The bottom surface S1 is a surface of the laminate 12 on the negative side in the y-axis direction, and serves as a mounting surface to face a circuit board when the electronic component 10*e* is mounted on the circuit board. The top surface S2 is a surface of the laminate 12 on the positive side in the z-axis direction. The side surface S3 is a surface of the laminate 12 on the negative side in the x-axis direction. The side surface S4 is a surface of the laminate 12 on the positive side in the x-axis direction. The end surface S5 is a surface of the laminate 12 on the negative side in the y-axis direction. The end surface S6 is a surface of the laminate 12 on the positive side in the y-axis direction.

The laminate 12 is formed by laminating insulator layers 16*a* to 16*l* in this order, from the positive side toward the negative side in the x-axis direction, as shown in FIG. 12. Each of the insulator layers 16*a* to 16*l* has a square shape, and is made of, for example, a Ni—Cu—Zn ferrite magnetic material. In the following, the surfaces of the insulator layers 16*a* to 16*l* on the positive side in the x-axis direction will be referred to as the front faces, and the surfaces of the insulator layers 16*a* to 16*l* on the negative side in the x-axis direction will be referred to as the back faces.

The bottom surface S1 is formed by a series of the sides of the insulator layers 16*a* to 16*l* on the negative side in the z-axis direction. The top surface S2 is formed by a series of the sides of the insulator layers 16*a* to 16*l* on the positive side in the z-axis direction. The side surface S3 is formed by the back face of the insulator layer 16*l*. The side surface S4 is formed by the front face of the insulator layer 16*a*. The end surface S5 is formed by a series of the sides of the insulator layers 16*a* to 16*l* on the negative side in the y-axis direction. The end surface S6 is formed by a series of the sides of the insulator layers 16*a* to 16*l* on the positive side in the y-axis direction.

The coil L includes coil conductors 18*a* to 18*d* and via-hole conductors v1 to v3, as shown in FIG. 12. The coil L is a helical coil formed by connecting the coil conductors 18*a* to 18*d* by the via-hole conductors v1 to v3. The coil L has a coil axis extending in the x-axis direction, and spirals counterclockwise toward the negative side in the x-axis direction in a plan view from the positive side in the x-axis direction. Moreover, the coil L has terminals t1 and t2. The terminal t1 of the coil L is positioned on the positive side in the x-axis direction relative to the terminal t2.

The coil conductors 18*a* to 18*d* are provided on the insulator layers 16*e* to 16*h*, respectively, as shown in FIG. 12. Each of the coil conductors 18*a* to 18*d* is made of an Ag-based conductive material, and is a linear conductor curved in a U-like shape. Moreover, the coil conductors 18*a* to 18*d* overlap one another to form a square in a plan view in the x-axis direction. In the following, the ends of the coil conductors 18*a* to 18*d* that are located upstream in the counterclockwise direction will be simply referred to as the upstream ends, and the ends of the coil conductors 18*a* to 18*d* that are located downstream in the counterclockwise direction will be simply referred to as the downstream ends. The terminal t1 of the coil L is at the upstream end of the coil conductor 18*a*, and the terminal t2 of the coil L is at the downstream end of the coil conductor 18*d*.

The via-hole conductors v1 to v3 connect the coil conductors 18*a* to 18*d*. More specifically, the via-hole conductor v1 connects the downstream end of the coil conductor 18*a* to the upstream end of the coil conductor 18*b*. The via-hole conductor v2 connects the downstream end of the coil conductor 18*b* to the upstream end of the coil conductor 18*c*. The via-hole conductor v3 connects the downstream end of the coil conductor 18*c* to the upstream end of the coil conductor 18*d*.

The lead-out conductor 22 is provided on the front face of the insulator layer 16*d*, so as to be exposed between the insulator layers 16*c* and 16*d* at the bottom surface S1 and the end surfaces S5 and S6. More specifically, the lead-out conductor 22 has a rectangular shape extending in the y-axis direction and provided along the side of the insulator layer 16*d* on the negative side in the z-axis direction, and the lead-out conductor 22 is in contact with opposite ends of the insulator layer 16*d* in the y-axis direction. As a result, the lead-out conductor 22 is exposed at the bottom surface S1 as a linear strip extending in the y-axis direction, and also exposed at the end surfaces S5 and S6 as a linear strip extending in the z-axis direction.

The dummy lead-out conductors 20*a* and 20*b* are provided on the front faces of the insulator layers 16*b* and 16*c*, respectively, so as to be exposed between the insulator layers 16*a* to 16*c* at the bottom surface S1. The dummy lead-out conductors 20*a* and 20*b* have the same shape as the lead-out conductor 22, and are aligned in an entirely overlapping manner in a plan view in the y-axis direction. As a result, the lead-out conductor 22 and the dummy lead-out conductors 20*a* and 20*b* are exposed within a rectangular formation area A1 at the bottom surface S1, as shown in FIG. 13A.

The lead-out conductor 26 is provided on the front face of the insulator layer 16*i*, so as to be exposed between the insulator layers 16*h* and 16*i* at the bottom surface S1 and the end surfaces S5 and S6. More specifically, the lead-out conductor 26 has a rectangular shape extending in the y-axis direction and provided along the side of the insulator layer 16*i* on the negative side in the z-axis direction, and the lead-out conductor 26 is in contact with opposite ends of the insulator layer 16*i* in the y-axis direction. As a result, the lead-out conductor 26 is exposed at the bottom surface S1 as a linear strip extending in the y-axis direction, and also exposed at the end surfaces S5 and S6 as a linear strip extending in the z-axis direction.

The dummy lead-out conductors 24*a* and 24*b* are provided on the front faces of the insulator layers 16*j* and 16*k*, respectively, so as to be exposed between the insulator layers 16*i* to 16*k* at the bottom surface S1. The dummy lead-out conductors 24*a* and 24*b* have the same shape as the lead-out conductor 26, and are aligned in an entirely overlapping manner in a plan view in the y-axis direction. As a result, the lead-out conductor 26 and the dummy lead-out conductors 24*a* and 24*b* are exposed within a rectangular formation area A2 at the bottom surface S1, as shown in FIG. 13A.

The via-hole conductors v4 to v6 are provided so as to pierce through the insulator layers 16*b* to 16*d*, respectively, in the x-axis direction, and overlap one another in a plan view in the x-axis direction. The via-hole conductor v4 connects the dummy lead-out conductors 20*a* and 20*b*. The via-hole conductor v5 connects the dummy lead-out conductor 20*b* and the lead-out conductor 22. The via-hole conductor v6 connects the lead-out conductor 22 and the upstream end of the coil conductor 18*a*.

The via-hole conductors v7 to v9 are provided so as to pierce through the insulator layers 16*h* to 16*j*, respectively, in the x-axis direction, and overlap one another in a plan view in the x-axis direction. The via-hole conductor v7 connects the downstream end of the coil conductor 18*d* and the lead-out conductor 26. The via-hole conductor v8 connects the lead-out conductor 26 and the dummy lead-out conductor 24*a*. The via-hole conductor v9 connects the dummy lead-out conductors 24*a* and 24*b*.

The external electrode 14*a* is formed by directly plating the bottom surface S1 and the end surfaces S5 and S6, so as to cover the dummy lead-out conductors 20*a* and 20*b* and the lead-out conductor 22, as shown in FIG. 13B. As a result, the external electrode 14*a* is formed within the formation area A1 at the bottom surface S1 of the laminate 12. The external electrode 14*b* is formed by directly plating the bottom surface S1 and the end surfaces S5 and S6, so as to cover the dummy lead-out conductors 24*a* and 24*b* and the lead-out conductor 26, as shown in FIG. 13B. As a result, the external electrode 14*b* is formed within the formation area A2 at the bottom surface S1 of the laminate 12. Moreover, the external electrode 14*a* is positioned on the positive side in the x-axis direction relative to the external electrode 14*b*. Examples of the materials of the external electrodes 14*a* and 14*b* include Cu, Ni, and Sn.

The electronic component 10*e* thus configured has features as will be described below, in the cross section shown in FIG. 14, which is normal to the y-axis direction and includes the lead-out conductor 22, the dummy lead-out conductors 20*a* and 20*b*, and the coil conductors 18*a* to 18*d*. First, a portion of the cross section that includes the lead-out conductor 22 and the dummy lead-out conductors 20*a* to 20*g* will be referred to as a cross-sectional region E1. The rest of the cross section other than the cross-sectional region E1, which includes the coil conductors 18*a* to 18*d*, will be referred to as a cross-sectional region E2. The cross-sectional region E1 is a region between the bottom surface S1 and a line L2 parallel to the x-axis and dividing the dummy lead-out conductors 20*a* to 20*g* from the coil conductors 18*a* to 18*d*. The cross-sectional region E2 is a region between the top surface S2 and the line L2.

As shown in FIG. 14, the proportion of an area occupied by the lead-out conductor 22 and the dummy lead-out conductors 20*a* and 20*b* in the cross-sectional region E1 is greater than the proportion of an area occupied by the coil conductors 18*a* to 18*d* in the cross-sectional region E2.

Furthermore, there are features as will be described below, in a cross section normal to the y-axis direction and including the lead-out conductor 26, the dummy lead-out conductors 24*a* and 24*b*, and the coil conductors 18*a* to 18*d*. First, a portion of the cross section that includes the lead-out conductor 26 and the dummy lead-out conductors 24*a* and 24*b* will be referred to as a cross-sectional region E1. The rest of the cross section other than the cross-sectional region E1, which includes the coil conductors 18*a* to 18*d*, will be referred to as a cross-sectional region E2. The cross-sectional region E1 is a region between the bottom surface S1 and a line L2 parallel to the x-axis and dividing the coil conductors 18*a* to 18*d* from the dummy lead-out conductors 24*a* and 24*b*. The cross-sectional region E2 is a region between the top surface S2 and the line L2.

The proportion of an area occupied by the lead-out conductor 26 and the dummy lead-out conductors 24*a* and 24*b* in the cross-sectional region E1 is greater than the proportion of an area occupied by the coil conductors 18*a* to 18*d* in the cross-sectional region E2.

Furthermore, in the electronic component 10*e*, the formation areas A1 and A2, when viewed in a plan view in an extending direction (y-axis direction) in which the sides of the insulator layers 16*a* to 16*l* that constitute the bottom surface S1 extend, are curved so as to bulge at the center toward the negative side in the z-axis direction relative to the opposite ends, as shown in FIG. 14.

Furthermore, the external electrodes 14*a* and 14*b* are provided in the formation areas A1 and A2, respectively. Therefore, the external electrodes 14*a* and 14*b*, when viewed in a plan view in the y-axis direction, are also curved so as to bulge at the center toward the negative side in the z-axis direction relative to the opposite ends.

As with the electronic component 10, the electronic component 10*e* thus configured renders it possible to inhibit air from being left trapped in the solder that connects the lands of the circuit board to the external electrodes 14*a* and 14*b*.

Furthermore, in the electronic component 10*e*, solder adheres to the parts of the external electrode 14*a* that are provided at the end surfaces S5 and S6 and the parts of the external electrode 14*b* that are provided at the end surfaces S5 and S6. Accordingly, the surface tension of the solder that pulls the electronic component 10*e* toward the circuit board is greater than the surface tension of the solder that pulls the electronic component 10 toward the circuit board. As a result, the electronic component 10*e* can be mounted on the circuit board more firmly.

Furthermore, in the electronic component 10*e*, the external electrodes 14*a* and 14*b* are not provided at the side surfaces S3 and S4. Therefore, an eddy-current loss is inhibited from being caused by the passage of a magnetic flux generated by the coil L, so that a reduction in the Q factor of the coil L is inhibited.

Furthermore, the axis of the coil L is perpendicular to the side surfaces S3 and S4, and the external electrodes 14*a* and 14*b* are not provided at the side surfaces S3 and S4. Accordingly, there is less floating capacitance between the coil L and the external electrodes 14*a* and 14*b*. As a result, the high-frequency characteristics of the coil L are improved.

OTHER EMBODIMENTS

The present disclosure is not limited to the electronic components 10 and 10*a* to 10*e*, and modifications can be made within the spirit and scope of the disclosure.

Note that the dummy lead-out conductors 20 and 24 are not necessarily connected by via-hole conductors.

Note that in the electronic component 10, the coil conductors 18*a* to 18*d*, the dummy lead-out conductors 20*a* to 20*g* and 24*a* to 24*g*, and the lead-out conductors 22 and 26 may be equal in thickness.

Note that the circuit elements included in the electronic components 10 and 10*a* to 10*e* are not limited to the coils L. Accordingly, the circuit elements may be capacitors, etc.

Note that the features of the electronic components 10 and 10*a* to 10*e* may be provided in combination.

Although the present disclosure has been described in connection with the preferred embodiment above, it is to be noted that various changes and modifications are possible to those who are skilled in the art. Such changes and modifications are to be understood as being within the scope of the disclosure.

What is claimed is:

1. An electronic component comprising:

a laminate having a plurality of rectangular insulator layers and a mounting surface formed by a series of sides of the insulator layers;

a plurality of first lead-out conductors exposed between the insulator layers at the mounting surface;

a first external electrode covering the first lead-out conductors at the mounting surface;

a plurality of second lead-out conductors exposed between the insulator layers at the mounting surface; and a second external electrode covering the second lead-out conductors at the mounting surface, the first external electrode being located at a first formation area at the mounting surface, and the first formation area, when viewed in a plan view in an extending direction in which the sides of the insulator layers that constitute the mounting surface extend, being curved so as to bulge at a center of the first formation area relative to opposite ends thereof.

2. The electronic component according to claim 1, further comprising a circuit element including a plurality of conductive members.

3. The electronic component according to claim 2, wherein, in a cross section normal to the extending direction and including the first lead-out conductors and the conductive members, a part of the cross section is a first cross-sectional region including the first lead-out conductors and the mounting surface, and the rest of the cross section other than the first cross-sectional region is a second cross-sectional region including the conductive members, a proportion of an area occupied by the first lead-out conductors in the first cross-sectional region is greater than the proportion of an area occupied by the conductive members in the second cross-sectional region.

4. The electronic component according to claim 2, wherein a part of the first lead-out conductors is provided outside of opposite ends of the circuit element in a direction of lamination of the plurality of rectangular insulator layers.

5. The electronic component according to claim 4, wherein the part of the first lead-out conductor provided outside the opposite ends of the circuit element is thicker than the first lead-out conductor provided inside the opposite ends of the circuit element in the direction of lamination.

6. The electronic component according to claim 4, wherein a height from the mounting surface to a top of one first lead-out conductor provided outside the opposite ends of the circuit element in the direction of lamination is greater than a height from the mounting surface to a top of one first lead-out conductor provided inside the opposite ends of the circuit element in the direction of lamination.

7. The electronic component according to claim 2, wherein each of the first lead-out conductors is thicker than each of the conductive members.

8. The electronic component according to claim 2, wherein one insulator layer provided outside opposite ends of the circuit element in a direction of lamination of the plurality of rectangular insulator layers is thinner than one insulator layer provided inside the opposite ends of the circuit element in the direction of lamination.

9. The electronic component according to claim 1, wherein the first external electrode and the second external electrode are arranged in the extending direction.

10. The electronic component according to claim 9, wherein, in a plan view in the extending direction, a distance in a direction normal to the mounting surface from the most bulging point of the mounting surface to the opposite ends of the mounting surface is from 0.15 μm to 12.5 μm.

11. The electronic component according to claim 1, wherein the first external electrode is formed by plating.

12. The electronic component according to claim 1, wherein the laminate is sintered.

13. The electronic component according to claim 1, wherein the second external electrode is located at a second formation area at the mounting surface, and the second formation area, when viewed in a plan view in the extending direction, is curved so as to bulge at a center of the second formation area relative to opposite ends thereof.

14. A method for producing an electronic component including a laminate having a plurality of rectangular insulator layers and a mounting surface formed by a series of sides of the insulator layers;

a plurality of first lead-out conductors exposed between the insulator layers at the mounting surface;

a first external electrode covering the first lead-out conductors at the mounting surface;

a plurality of second lead-out conductors exposed between the insulator layers at the mounting surface; and a second external electrode covering the second lead-out conductors at the mounting surface, the first external electrode being located at a first formation area at the mounting surface, and the first formation area, when viewed in a plan view in an extending direction in which the sides of the insulator layers that constitute the mounting surface extend, being curved so as to bulge at a center of the first formation area relative to opposite ends thereof, and a circuit element including a plurality of conductive members, comprising steps of:

obtaining the laminate in an unfired state, the laminate being provided with the first lead-out conductors and the conductive members; and firing the laminate.

15. An electronic component comprising:

a laminate having a plurality of rectangular insulator layers and a mounting surface formed by a series of sides of the insulator layers, a plurality of first lead-out conductors exposed between the insulator layers at the mounting surface, a first external electrode covering the first lead-out conductors at the mounting surface, a plurality of second lead-out conductors exposed between the insulator layers at the mounting surface, a second external electrode covering the second lead-out conductors at the mounting surface, the first external electrode being provided in a first formation area at the mounting surface, and the first formation area, when viewed in a plan view in an extending direction in which the sides of the insulator layers that constitute the mounting surface extend, being curved so as to bulge at a center relative to opposite ends of the first formation area, a second formation area, when viewed in the plan view, being curved so as to bulge at a center relative to opposite ends of the second formation area.

16. The electronic component according to claim 15, further comprising a circuit element including a plurality of conductive members.

17. An electronic component comprising:

a laminate having a plurality of rectangular insulator layers and a mounting surface formed by a series of sides of the insulator layers;

a plurality of first lead-out conductors exposed between the insulator layers at the mounting surface; and a first external electrode covering the first lead-out conductors at the mounting surface, the first external electrode being located at a first formation area at the mounting surface, and the first formation area, when viewed in a plan view in an extending direction in which the sides of the insulator layers that constitute the mounting surface extend, being curved so as to bulge at a center of the first formation area relative to opposite ends thereof, wherein in a cross section normal to the extending direction and including the first lead-out conductors and the conductive members, a part of the cross section is a first cross-sectional region including the first lead-out conductors and the mounting surface, and the rest of the cross section other than the first cross-sectional region is a second cross-sectional region including the conductive members, a proportion of an area occupied by the first lead-out conductors in the first cross-sectional region is greater than the proportion of an area occupied by the conductive members in the second cross-sectional region.

18. An electronic component comprising:

a laminate having a plurality of rectangular insulator layers and a mounting surface formed by a series of sides of the insulator layers;

a plurality of first lead-out conductors exposed between the insulator layers at the mounting surface;

a first external electrode covering the first lead-out conductors at the mounting surface, the first external electrode being located at a first formation area at the mounting surface, and the first formation area, when viewed in a plan view in an extending direction in which the sides of the insulator layers that constitute the mounting surface extend, being curved so as to bulge at a center of the first formation area relative to opposite ends thereof; and a circuit element including a plurality of conductive members; wherein a part of the first lead-out conductors is provided outside of opposite ends of the circuit element in a direction of lamination of the plurality of rectangular insulator layers, and the part of the first lead-out conductor provided outside the opposite ends of the circuit element is thicker than the first lead-out conductor provided inside the opposite ends of the circuit element in the direction of lamination.

19. An electronic component comprising:

a laminate having a plurality of rectangular insulator layers and a mounting surface formed by a series of sides of the insulator layers;

a plurality of first lead-out conductors exposed between the insulator layers at the mounting surface;

a first external electrode covering the first lead-out conductors at the mounting surface, the first external electrode being located at a first formation area at the mounting surface, and the first formation area, when viewed in a plan view in an extending direction in which the sides of the insulator layers that constitute the mounting surface extend, being curved so as to bulge at a center of the first formation area relative to opposite ends thereof; and a circuit element including a plurality of conductive members; wherein one insulator layer provided outside opposite ends of the circuit element in a direction of lamination of the plurality of rectangular insulator layers is thinner than one insulator layer provided inside the opposite ends of the circuit element in the direction of lamination.

20. An electronic component comprising:

a laminate having a plurality of rectangular insulator layers and a mounting surface formed by a series of sides of the insulator layers;

a plurality of first lead-out conductors exposed between the insulator layers at the mounting surface;

a first external electrode covering the first lead-out conductors at the mounting surface, the first external electrode being located at a first formation area at the mounting surface, and the first formation area, when viewed in a plan view in an extending direction in which the sides of the insulator layers that constitute the mounting surface extend, being curved so as to bulge at a center of the first formation area relative to opposite ends thereof; and a circuit element including a plurality of conductive members; wherein a part of the first lead-out conductors is provided outside of opposite ends of the circuit element in a direction of lamination of the plurality of rectangular insulator layers, and a height from the mounting surface to a top of one first lead-out conductor provided outside the opposite ends of the circuit element in the direction of lamination is greater than a height from the mounting surface to a top of one first lead-out conductor provided inside the opposite ends of the circuit element in the direction of lamination.

* * * * *